C. A. BROWN & C. E. SEDORE.
Saw.

No. 165,152. Patented July 6, 1875.

WITNESSES:
Millard Farr
F. M. Quimby

INVENTORS
C. A. Brown
C. E. Sedore
Per Edw. E. Quimby
their atty.

UNITED STATES PATENT OFFICE.

CHRISTOPHER A. BROWN, OF BROOKLYN, AND CHARLES E. SEDORE, OF NEW YORK, N. Y.

IMPROVEMENT IN SAWS.

Specification forming part of Letters Patent No. 165,152, dated July 6, 1875; application filed January 9, 1875.

*To all whom it may concern:*

Be it known that we, CHRISTOPHER A. BROWN, of Brooklyn, New York, and CHARLES E. SEDORE, of the city and State of New York, have invented certain Improvements in Saws for cutting cuneiform notches, of which the following is a specification.

Our improvement relates to revolving saws, and consists in the rhomboidal shape of our saws.

The object of our invention is to cut a cuneiform notch in a plank or other object by a revolving cutting instrument.

Figure 2:
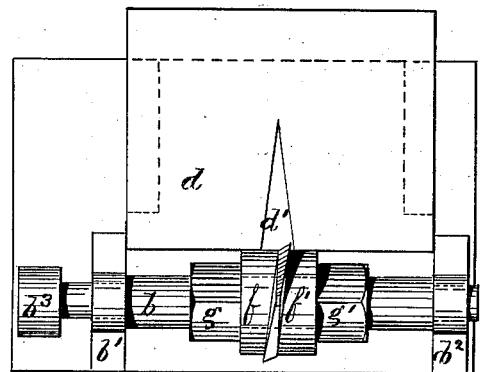
Figure 4:
Figure 1:
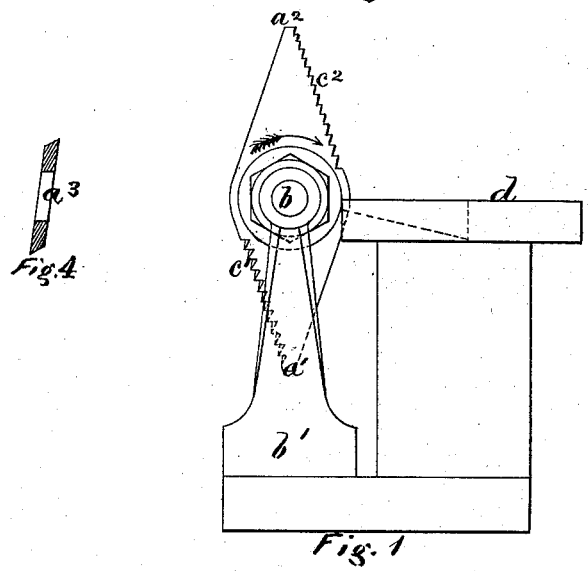
Figure 3:
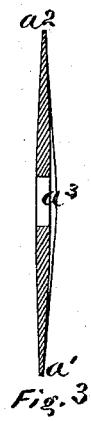

The accompanying drawings are as follows: Figure 1 is an end elevation of a saw-table provided with our rhomboidal saw, showing the teeth found upon the two cutting-edges of the saw. Fig. 2 is a top view of the same. Fig. 3 is a central longitudinal section of the saw-blade; and Fig. 4 is a transverse section of the saw-blade, showing the oblique direction of the hole through it, by which it is mounted on the saw-shaft.

As the novelty in our invention consists only in the peculiar shape of our saw, we do not deem it necessary to describe any mechanism for feeding the material to be cut up to the saw, or vice versa, because such mechanism is well known, and is in common use, in connection with the ordinary circular saws.

On reference to the drawings it will be seen that our saw consists of a rhomboidal or lozenge shaped blade, thickest in the middle, and diminishing in thickness toward the extreme points $a^1$ and $a^2$. In the middle a hole, $a^3$, is bored angularly through the saw, by means of which it is mounted upon the saw-shaft $b$ in such a position that its shorter diameter occupies a plane inclined to the axis of the shaft, as shown in Fig. 2, while its longer diameter occupies a plane at right angles with the shaft. Thus the extreme cutting-points of the saw $a^1$ and $a^2$ describe a circle in the same plane, while each successive tooth on either side of the blade describes a circle in a different plane, parallel to the first. The arrows on Fig. 1 indicate the direction of rotation, and it will be seen that the saw has two cutting-edges, $c^1$ and $c^2$. The saw-shaft is mounted upon the standards $b^1$ and $b^2$, and is provided with a pulley, $b^3$, by means of which it receives its rotation. The saw-table $d$ is arranged in suitable proximity to the cutting instrument to support the material operated upon, and has a cuneiform opening, $d^1$, on the edge toward the saw, which corresponds in shape to the notch which the saw cuts. Any desired number of these saws may be mounted upon the same shaft, in close proximity to each other, and the saw-table may be provided with a corresponding number of openings, when it is desired, to cut a series of cuneiform notches at the same time. The saw is secured upon the shaft by means of the bevel-faced washers $f$ and $f^1$, and the nuts $g$ and $g^1$, which engage a screw-thread cut upon the shaft—that is to say, the usual mode of mounting the saw is adopted, excepting that the washers bearing against the saw have their faces beveled to correspond with the inclined position of the saw-blade.

In operation the material to be cut is fed toward the saw, which is revolved with great rapidity. As the feeding operation progresses, the saw alternately cuts or rasps away the material in opposite directions from the central cut, with a steadily-increasing departure from the central line of such cut, on either side. By varying the inclination of the saw to the axis of the shaft a more or less acute notch can be cut, as may be desired, and by varying the length of the rhomboidal blade notches of greater or less depth may be cut. The saw-blade is made thickest in the middle, as shown in the sections, and diminishes toward the extreme points, as shown in Fig. 3. It may be thus diminished to a knife-edge at the extreme points $a^1$ and $a^2$, if it be desired.

We claim as our invention—

A rhomboidal saw-blade having teeth on two of its parallel edges, and tapering in thickness from the middle to the ends, substantially as described.

C. A. BROWN.
C. E. SEDORE.

Witnesses:
NATH. A. PRENTISS,
JULIUS R. POMEROY.